Aug. 5, 1969  G. W. KELLY  3,458,882
THREAD-CUTTING DEVICE
Filed March 27, 1967

INVENTOR.
GERALD W. KELLY
BY
Learman + M'Culloch

United States Patent Office 3,458,882
Patented Aug. 5, 1969

3,458,882
THREAD-CUTTING DEVICE
Gerald W. Kelly, 7447 Dixie Highway,
Bridgeport, Mich. 48722
Filed Mar. 27, 1967, Ser. No. 626,065
Int. Cl. B23g 5/06
U.S. Cl. 10—141        8 Claims

ABSTRACT OF THE DISCLOSURE

A tap having a body threaded for a portion of its length and at one end of which the thread is interrupted by one or more outwardly concave flutes which communicate with a corresponding number of axially extending, outwardly convex grooves which interrupt the thread. At the opposite end of the body is a pair of tandem headed coupling members separated from one another by an annular groove.

---

The invention disclosed herein comprises a thread-cutting device or tap and more particularly a tap construction which, as compared to conventional tap constructions, is stronger, more rigid and provides greater resistance to breakage but which, if broken, facilitates removal from the workpiece being threaded.

A conventional tap comprises an elongated, generally cylindrical body member having a smooth shank portion adjacent one end and a toothed adjacent the other end, the teeth being formed by a helical thread that is interrupted circumferentially by one or more flutes which are grounded in the body and extend at least the full length of the threaded portion. The grinding of the flutes forms the cutting teeth and the necessary clearance to enable the teeth to cut threads in a workpiece. The grinding of the flutes also removes material from the tap body and, therefore, cannot help but weaken the latter.

The threads or cutting teeth at the cutting end of a conventional tap are tapered radially inwardly or truncated so as to facilitate the introduction of the cutting end of the tap to an opening in a workpiece that is to be threaded and begin the threading operation. The axial length of the taper conventionally extends for a relatively small number of teeth, with the result that all of the remaining teeth of the tap have a uniform diameter. The actual thread cutting teeth of the tap, therefore, are those that are included in the tapered portion of the tap, the remaining teeth being employed to follow the thread cut by the tapered teeth so as to assist in feeding the tap into the workpiece.

In the use of a conventional tap of the kind described, the frictional force exerted by the workpiece on the tap increases as the tap is fed more deeply into the workpiece. This necessarily follows inasmuch as a greater number of the tap threads are introduced to the workpiece as the tap is fed into the workpiece. As the friction increases, a greater amount of torque must be applied to the tap in order to enable it to continue to be fed into the workpiece. The increase in torque and the increase in friction impose greater torsional forces on the tap, and it frequently happens that the tap breaks. Inasmuch as a conventional tap is fluted for the full length of the threaded portion, the threaded portion of the tap is weaker than the shank portion thereof and, consequently, when such a tap breaks, it almost invariably breaks at some point between the ends of the cutting thread.

When a conventional tap breaks in use, it is a simple matter to extract from the workpiece the shank portion of the tap and that part of the threaded portion which is joined to the shank portion. However, it is a difficult and time consuming task to retrieve from the workpiece that part of the threaded portion of the tap which remains in the workpiece. If the workpiece being threaded is relatively inexpensive, the workpiece containing the broken tap may be discarded, but if the workpiece is large or expensive, it cannot be discarded. Instead, the time and trouble must be taken to remove the broken tap from the workpiece.

The susceptibility of conventional taps to breakage is increased when the cutting teeth become dull. This is because a dull tooth encounters more friction to its movement, thereby necessitating the application of greater torque.

Tap breakage also frequently is encountered as a result of misalignment of the tap and the opening in the workpiece that is to be threaded. For example, it often is difficult to obtain a truly coaxial relationship between the opening in the workpiece and the tap. In instances of such misalignment, relative rotation between the tap and the workpiece imposes on the tap a flexing or bending force which increases as the tap is fed into the workpiece. The weakening of a tap by the provision of the conventional flutes renders the tap less able to resist breakage due to such misalignment.

The flexing or bending force imposed on a tap by misalignment of the latter and the opening in the workpiece to be threaded does not always cause tap breakage, but the ability of the tap to flex nevertheless is undesirable inasmuch as it causes the threads formed in the workpiece to be nonuniform in depth. The removal of material from the tap in the conventional fluting process weakens the tap and causes it to have greater flexibility than it otherwise would have, thereby increasing the possibility that such misalignment will result in nonuniform threads being cut in the workpiece.

An object of this invention is to provide a thread cutting tap construction which overcomes the disadvantages referred to above.

Another object of the invention is to provide a tap construction which is capable of performing as well as, if not better than, conventional taps and which has greater resistance to flexing and breaking.

A further object of the invention is to provide a tap having a deliberately weakened zone where the tap is designed to break, should breakage occur, and that is so located as to assure breakage externally of the workpiece on which the tap is operating.

Other objects and advantages of the invention will be pointed out specifically or will become apparent from the following description when it is considered in conjunction with the appended claims and the accompanying drawing, in which:

Figure 1:
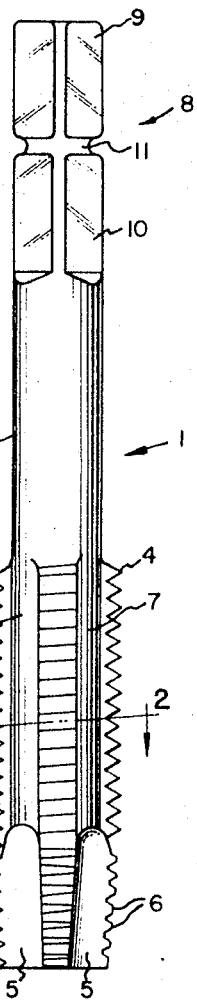
FIGURE 1 is an elevational view of a tap constructed in accordance with the invention.

A tap constructed in accordance with the embodiment of the invention disclosed in FIGURES 1–4 comprises a generally cylindrical, solid, elongated body 1 formed of steel or other suitable material having a smooth shank portion 2 which terminates at one end of a threaded portion 3 having a helical spiral thread 4 which extends to one end of the body 1. Adjacent the one end of the body, the thread 4 is truncated or tapered, and the thread is interrupted by a plurality of axially extending flutes 5 ground in the body 1, whereby the truncated threads form cutting teeth 6. The axial length of the flutes 5 corresponds substantially to the length of ther tapered zone of the thread 4, but is substantially less than the axial length of the threaded portion 3 of the body.

Figure 3:
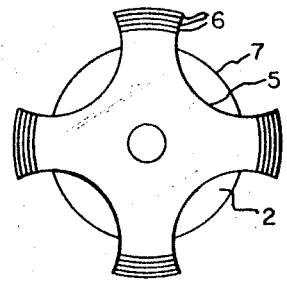
FIGURE 3 is an enlarged, elevational view of one end of the tap.
Figure 4:
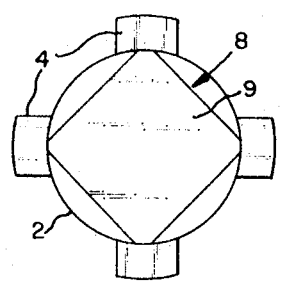
FIGURE 4 is an end elevational view of the opposite end of the tap.

In communication with each of the flutes 5 and extending axially in prolongation thereof is a groove or gap 7 which interrupts the thread 4. As is best indicated in FIGURE 3, there are four flutes 5 and four grooves or gaps 7 spaced uniformly about the circumference of the body 1.

Figure 2:
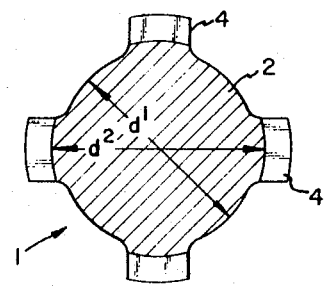
FIGURE 2 is an enlarged view of a tap constructed on the line 2—2 of FIGURE 1.

An important characteristic of the tap construction is that the depth of the grooves 7 is such that the minimum diameter $d^1$ of the threaded portion of the body 1 is no less than the diameter of the smooth shank portion 2. The root diameter $d^2$ of the thread 4 is a few thousandths inch greater than the diameter $d^1$, as is shown in FIGURE 2, so that each groove 7 provides a slight clearance through which lubricant can pass. The construction is such that the surface of each groove 7 is outwardly convex, as is indicated in FIGURES 2 and 3. In contrast, the surface of each flute 5 is outwardly concave, as is indicated in FIGURE 3. Thus, from the juncture of the flutes 5 and the grooves 7, the cross-sectional area of the threaded body portion excluding the thread 4 corresponds to the cross-sectional area of the shank body portion 2. When the diameter $d^2$ is considered, however, the cross-sectional area of the threaded portion is greater than the cross-sectional area of the shank portion 2. From the juncture of the flutes 5 and the grooves 7, therefore, the strength of the threaded zone 3 is at least as great as, or greater than, that of the smooth shank portion 2.

A coupling head 8 is provided for connecting the body 1 to a power or manually operable tool or other device (not shown) for effecting rotation of the body. The coupling head is multi-sided, preferably square in cross-section, and located at the end of the body 1 opposite the threaded end. The axial length of the head 8 is substantially twice that normally provided for a tap and is divided into two axially spaced parts 9 and 10 by an annular groove or neck 11. The depth of the groove 11 is such that the cross-sectional area of the body 1 at the zone of the groove 11 is less than that of any other portion of the body from the head 8 to the juncture of the flutes 5 and the grooves 7. Accordingly, it is at the zone of the groove 11 that the strength of the body is the least.

Figure 5:
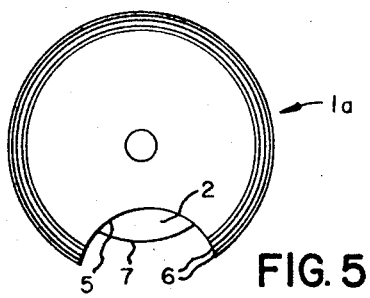
FIGURE 5 is a view similar to FIGURE 3, but illustrating a modified tap construction.

The embodiment illustrated in FIGURE 5 has a body 1a identical to the body 1 in all respects with the exception that the thread 4 is interrupted by a single, outwardly convex groove or gap 7 which extends in axial prolongation of a single, outwardy concave flute 5. The thread adjacent the flute 5 is truncated to form cutting teeth 6.

A tap constructed in accordance with either embodiment of the invention may be utilized in the same manner that any conventional tap is utilized, it being understood that the head portion 9 will be coupled to the driving tool and that the head portion 10 will be located externally of the tool. Imposition of torsion or bending forces on the body sufficient to break the latter will cause the body to break at the groove 11, rather than elsewere. In the event the body does break, the head portion 9 may be removed from the driving tool and the latter coupled to the head portion 10 so as to enable the body 1 to be withdrawn from the workpiece.

Although the body 1 or 1a is designed to break at the groove 11, the strength of the body at the groove 11 need be only a little less than the strength of the shank. In contrast to conventional tap constructions, the strength of the tap at the threaded portion 3 is at least as great as, and probably greater than, the strength of the smooth shank portion 2, thereby offering considerably more resistance than conventional taps to flexing and breakage.

The inclusion of the grooves 7 and their communication with the flutes 5 provides paths for chip and lubricant movement substantially to the same extent as would be provided if the flutes 5 extended the full length of the threaded portion 3. Thus, a tap constructed according to the invention possesses all of the advantageous characteristics of a conventional tap but has the additional advantages hereinbefore specified.

The disclosed embodiments are representative of presently preferred forms of the invention, but are intended to be illustrative rather than definitive thereof. The invention is defined in the claims.

I claim:

1. A tap construction comprising a body having a spiral thread thereon beginning at a zone between the ends of said body and extending to one end of said body, said thread being interrupted circumferentially of said body adjacent said one end thereof by at least one outwardly concave flute extending axially from said one end of said body toward the opposite end thereof but terminating at a zone short of the zone of beginning of said thread, said thread also being interrupted circumferentially of said body by at least one gap extending axially of said body in axial prolongation of said flute, said gap presenting an outwardly convex, unbroken surface; and coupling means at the opposite end of said body for connection to a driving member.

2. The construction set forth in claim 1 wherein the cross-sectional area of said body at any zone thereof between the zone of termination of said flute and the zone of beginning of said thread is at least as great as the cross-sectional area of said body at any zone between the zone of beginning of said thread and said coupling means.

3. The construction set forth in claim 1 wherein said thread tapers radially inwardly from the zone of termination of said flute to said one end of said body.

4. The construction set forth in claim 1 wherein there are more than one of said flutes, said flutes being uniformly spaced circumferentially of said body.

5. The construction set forth in claim 4 wherein the number of gaps corresponds to the number of said flutes.

6. The construction set forth in claim 4 wherein there are four of said flutes and four of said gaps.

7. The construction set forth in claim 1 wherein said coupling means comprises a multiple-sided head having an annular groove therein between its ends.

8. The construction set forth in claim 1 wherein said coupling means comprises a first flat-sided head member joined to said other end of said body, and a second flat-sided head member joined to said first head member and extending in prolongation thereof, said first and second head members being separated from one another by a neck portion of lesser cross-sectional area than that of said body.

References Cited

UNITED STATES PATENTS

| | | | |
|---|---|---|---|
| 1,398,156 | 11/1921 | Schroder | 10—141 |
| 2,275,097 | 3/1942 | Webb | 10—141 |
| 2,556,174 | 6/1951 | Evans | 10—141 |
| 2,740,974 | 4/1956 | Lewis | 10—141 |
| 3,083,609 | 4/1963 | Lovisek | 85—47 |

FOREIGN PATENTS

| | | |
|---|---|---|
| 15,820 | 11/1915 | Great Britain. |
| 104,855 | 3/1917 | Great Britain. |
| 459,689 | 1/1937 | Great Britain. |

CHARLES W. LANHAM, Primary Examiner

E. M. COMBS, Assistant Examiner

U.S. Cl. X.R.

85—47